United States Patent
Wagoner et al.

(10) Patent No.: US 9,859,808 B2
(45) Date of Patent: Jan. 2, 2018

(54) POWER CONVERTER TOPOLOGY FOR USE IN AN ENERGY STORAGE SYSTEM

(71) Applicant: General Electric Company, Schenectady, NY (US)

(72) Inventors: Robert Gregory Wagoner, Roanoke, VA (US); Harold Robert Schnetzka, Simpsonville, SC (US); Lukas Mercer Hansen, Niskayuna, NY (US); Wayne Allen Schultz, Binghamton, NY (US); Bennett Steven Sheron, Schenectady, NY (US); Douglas Austin, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/138,335

(22) Filed: Apr. 26, 2016

(65) Prior Publication Data
US 2017/0310234 A1    Oct. 26, 2017

(51) Int. Cl.
H02M 7/48 (2007.01)
H02M 5/458 (2006.01)

(52) U.S. Cl.
CPC .................. H02M 5/458 (2013.01)

(58) Field of Classification Search
CPC ............... H02M 5/458; H02M 7/4807; H02M 7/53873; Y02E 10/563; H02H 7/1216
USPC .... 363/17, 37, 39, 40, 44, 95, 98, 131, 132; 318/400.3, 801, 434
See application file for complete search history.

(56) References Cited

U.S. PATENT DOCUMENTS

| | | | |
|---|---|---|---|
| 6,803,746 B2 | 10/2004 | Aker et al. | |
| 7,005,829 B2* | 2/2006 | Schnetzka | H02M 7/125 318/801 |
| 7,193,826 B2* | 3/2007 | Crane | H02H 7/0833 361/23 |
| 8,284,574 B2* | 10/2012 | Chapman | H02M 7/537 363/132 |
| 8,369,116 B2 | 2/2013 | Maroon | |
| 8,644,037 B2* | 2/2014 | Raju | H02M 5/271 363/37 |
| 8,767,421 B2* | 7/2014 | Chapman | H02J 3/383 363/131 |
| 9,041,433 B2 | 5/2015 | Ausseresse et al. | |
| 9,559,595 B2* | 1/2017 | Benchaib | H02M 3/337 |

(Continued)

*Primary Examiner* — Rajnikant Patel
(74) *Attorney, Agent, or Firm* — Dority & Manning, P.A.

(57) ABSTRACT

Systems and methods associated with example power converter systems are disclosed. For instance, a power converter system can include a power converter couplable to an input power source and configured to generate an output power substantially at a grid frequency. The power converter can include one or more inverter bridge circuits, each associated with an output phase of the power converter. Each inverter bridge circuit can include one or more first switching modules having a pair of switching elements coupled in series with one another, and an output coupled between the pair of switching elements. At least one switching element of each first switching module includes a reverse blocking transistor. The power converter further includes one or more input bridge circuits having a plurality of second switching modules coupled in parallel, each second switching module comprising a pair of silicon carbide transistors.

20 Claims, 2 Drawing Sheets

(56) References Cited

U.S. PATENT DOCUMENTS

| | | |
|---|---|---|
| 2003/0102845 A1 | 6/2003 | Aker et al. |
| 2009/0285005 A1* | 11/2009 | Gopfrich .................. H02J 3/38 |
| | | 363/132 |
| 2011/0211378 A1 | 9/2011 | Maroon |
| 2012/0147494 A1 | 6/2012 | Sase et al. |
| 2013/0154391 A1 | 6/2013 | Urciuoli |
| 2014/0375361 A1 | 12/2014 | Ausseresse et al. |

* cited by examiner

POWER CONVERTER TOPOLOGY FOR USE IN AN ENERGY STORAGE SYSTEM

FIELD OF THE INVENTION

The present subject matter relates generally power converters, and more particularly to topologies for a power converter in an energy storage system.

BACKGROUND OF THE INVENTION

Energy storage systems often include a power converter that is configured to convert direct current (DC) power into a suitable power for application to a load, such as a generator, motor, electrical grid, or other suitable load. For instance, an energy storage system can include a power converter for producing alternating current (AC) power at a grid frequency (e.g. 60/50 Hz) suitable for application to an electrical grid. In solar or battery energy systems, the solar or battery source can provide direct current power to the power converter, which can then be converted to suitable AC output power for the electrical grid.

To provide increased output power capability, a power converter can include a plurality of bridge circuits coupled in parallel with one another. Each bridge circuit can include a plurality of switching elements. For instance, conventional power converters typically use insulated gate bipolar transistors (IGBTs) and/or metal-oxide semiconductor field-effect transistors (MOSFETs) as switching elements. The pulse-width-modulation (PWM) of the switching elements can be controlled according to a desired switching pattern to provide a desired output of the power converter.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a power converter system. The power converter system includes a power converter couplable to an input power source and configured to generate an output power substantially at a grid frequency. The power converter includes one or more inverter bridge circuits associated with an output phase of the power converter. Each inverter bridge circuit includes one or more first switching modules. Each first switching module includes a pair of switching elements coupled in series with one another and an output coupled between the pair of switching elements. At least one switching element of each first switching module comprises a reverse blocking transistor. The power converter further includes one or more input bridge circuits. Each input bridge circuit includes a plurality of second switching modules coupled in parallel. Each second switching module includes a pair of silicon carbide transistors.

Another example aspect of the present disclosure is directed to an energy storage system. The energy storage system includes an input power source. The energy storage system further includes a power converter couplable to the input power source and configured to generate an output power substantially at a grid frequency. The power converter includes one or more inverter bridge circuits. Each inverter bridge circuit is associated with an output phase of the power converter. Each inverter bridge circuit includes one or more inverter switching modules. Each inverter switching module includes a pair of switching elements coupled in series with one another and an output coupled between the pair of switching elements. At least one switching element of each inverter switching module includes a reverse blocking transistor. The power converter further includes one or more input bridge circuits. Each input bridge circuit includes a plurality of input switching modules coupled in parallel. Each input switching module includes a pair of silicon carbide transistors.

Yet another example aspect of the present disclosure is directed to a method of providing at least a single phase of output power to an electrical grid. The method includes receiving an input power to a first stage of a power converter system. The first stage of the power converter system includes one or more input switching modules. The one or more input switching modules includes one or more silicon carbide transistors. The method further includes providing a direct current power to a DC link of the power converter. The method further includes receiving the direct current power at a second stage of the power converter system. The second stage of the power converter system includes one or more inverter switching modules. The one or more inverter switching modules includes at least one reverse blocking transistor. The method further includes providing at least a single phase of output power to an electrical grid.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
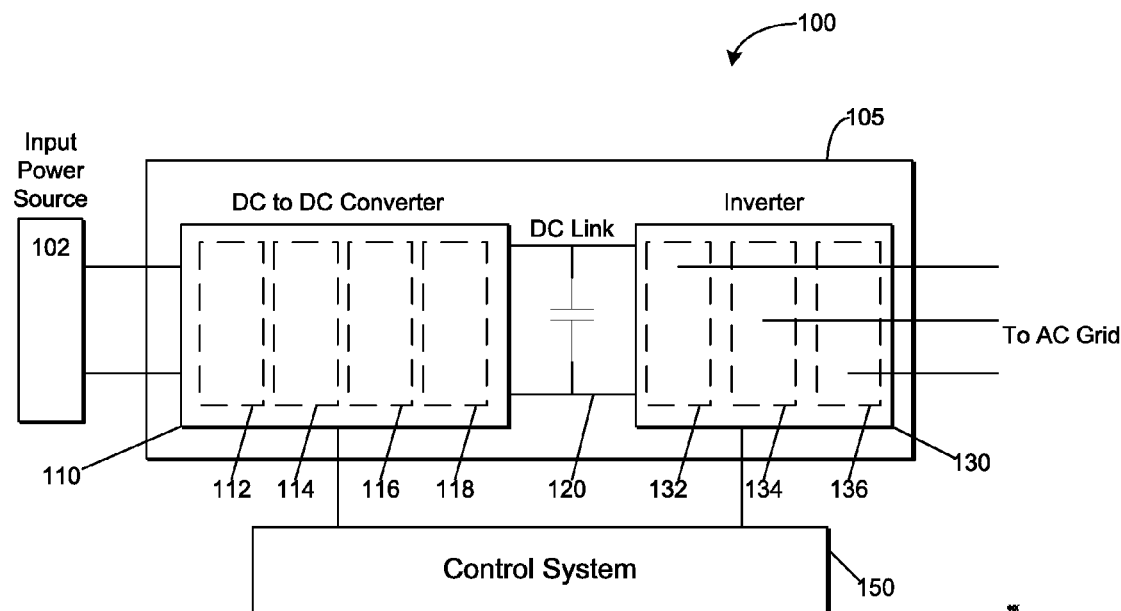
FIG. 1 depicts an example power converter system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to power converter systems for use in an energy storage system. For instance, a power converter system may include a power converter couplable to an input power source, such as one or more battery devices. The power converter can be configured to generate an output power substantially at a grid frequency. In particular, the power converter can include an input bridge circuit couplable to the input power source. The input bridge circuit can include a plurality of input switching modules coupled in parallel. Each input switching module can include a pair of switching elements, such as silicon carbide metal-oxide-semiconductor field-effect transistors (SiC MOSFETs). The input bridge circuit can generate an output direct current (DC) power to a DC link coupled between the input bridge circuit and an inverter bridge circuit.

The inverter bridge circuit can include one or more inverter switching modules. The inverter switching modules can include a pair of switching elements coupled in series. For instance, the inverter switching modules can include an upper switching element and a lower switching element coupled in series. According to example aspects of the present disclosure, the upper switching element can include at least one reverse blocking insulated-gate bipolar transistor (IGBT). For instance, the upper switching element can include a pair of reverse blocking IGBTs coupled in an antiparallel manner. In this manner, such switching element can be a bidirectional switching element configured to conduct current flowing to or from the electrical grid. The switching modules can include an output coupled between the pair of switching elements. The output can be associated with a single phase of output power. In some implementations, the power converter can provide a multiphase output power, and can have an inverter bridge circuit associated with each output phase of the multiphase output power.

In some implementations, the power converter can further include an isolation transformer coupled to the input bridge circuit. For instance, the isolation transformer can be a high frequency planar transformer or other suitable transformer. The isolation transformer can provide voltage isolation between the input power source and the inverter bridge circuit and/or the output. In some implementations, the isolation transformer can be a step up or step down transformer.

Example power converter systems of the present disclosure can provide a more efficient operation than conventional power converter systems. For instance, the use of SiC MOSFETS in the input bridge circuits can provide lower conduction and/or switching losses, higher peak repetitive pulsed to steady state current ratio, and/or higher switching frequency operation. Further, use of an isolation transformer (e.g. planar transformer) can provide higher frequency switching capabilities, reduced volume, and lower cost. The isolation transformer can further allow for an earth reference for the battery design without affecting the earth reference of the AC mains connection. Further still, use of reverse blocking IGBTs in the inverter bridge circuits can allow the system to be quickly and electronically disconnected from the AC mains, thereby eliminating a need for various contactors and fuses configured to disconnect the system from the AC mains. The reverse blocking IGBTs can further minimize or reduce "let through" energy in the case of an AC mains fault, and can minimize or reduce incident energy associated with an arc flash event associated with various sensing circuitry of the system. For instance, the reverse blocking IGBT pairs coupled in antiparallel can act as a bidirectional switching element configured to direct positive and negative currents. In alternative implementations, a pair of conventional IGBTs can be connected in inverse series, each having an associated freewheeling diode.

With reference now to the figures, example aspects of the present disclosure will be discussed in greater detail. For instance, FIG. 1 depicts an overview of an example power converter system 100 associated with an energy storage system according to example embodiments of the present disclosure. The power converter system 100 can be used to convert power generated by an input power source 102 to AC power substantially at a grid frequency (e.g. within about 10% of 50/60 Hz) suitable for supply to an AC grid. As used herein, the term "about," when used in conjunction with a numerical reference, is intended to refer to within 40% of the numerical reference. Input power source 102 can be associated with the energy storage system and can include one or more battery devices. In some implementations, input power source 102 can be rated to provide a DC voltage from about 100 volts to about 2000 volts. While the present disclosure will be discussed with reference to a power converter configured to convert energy generated by battery devices, those of ordinary skill in the art, using the disclosures provided herein, should understand that the power converter can similarly be used to convert power supplied from other energy sources, such as a photovoltaic array, or a wind turbine.

The power converter system 100 includes a power converter 105 and a control system 150 configured to control operation of the power converter 105. The power converter 105 is used to convert DC power generated by one or more battery devices 102 into AC power suitable for feeding to the AC grid. The power converter 105 depicted in FIG. 1 is a two-stage power converter that includes a DC to DC converter 110 and an inverter 130.

The DC to DC converter 110 can be a boost converter configured to boost the DC voltage supplied by the battery device(s) and provide the DC voltage to a DC link 120. The DC link 120 couples the DC to DC converter 110 to the inverter 130. As illustrated, the DC to DC converter 110 can include one or more bridge circuits 112, 114, 116, and 118 that include a plurality of switching modules used to generate the DC power provided to the DC link 120. In some implementations, each of the plurality of input bridge circuits 112, 114, 116, and 118 can be associated with an input feed line to the DC to DC converter 110. As will be discussed with reference to FIG. 2 below, each of the input bridge circuits 112, 114, 116, and 118 can include a plurality of input switching modules, such as SiC MOSFET modules, coupled in parallel to provide increased power output. DC to DC converter 110 can further include or have an associated isolation transformer configured to provide voltage isolation between the AC grid and the input power source 102. DC to DC converter 110 can be a part of or integral with inverter 130 or can be a separate standalone structure. In addition, more than one DC to DC converter 110 can be coupled to the same inverter 130 through one or more DC links.

The inverter 130 converts the DC power provided to the DC link 120 into AC power at a grid frequency suitable for feeding to the AC grid. The inverter 130 can be configured to provide a multiphase output, such as a three-phase output to the AC grid. The inverter 130 can include a plurality of inverter bridge circuits 132, 134, and 136. Each of the plurality of inverter bridge circuits 132, 134, and 136 can be associated with an output phase of the power converter 105. As will be discussed with reference to FIG. 2 below, each of the plurality of inverter bridge circuits can include a plurality of inverter switching modules, such as IGBT modules, coupled in parallel to provide an increased power output. As indicated above, such IGBT modules can include at least one reverse blocking IGBT. In some implementations, such IGBT modules can include a bidirectional switching element that includes a pair of reverse blocking IGBTs coupled in antiparallel.

Control system 150 can include one or more controllers or other control devices configured to control various components of the power converter system 100, including both the DC to DC converter 110 and the inverter 130. For instance, as will be discussed in more detail below, the control system 150 can send commands to the DC to DC converter 110 to regulate the output of the DC to DC converter 110 pursuant to a control method that regulates the duty cycles of switching elements (e.g. SiC MOSFETs) used in the DC to DC converter 110. Control system 150 can also regulate the output of inverter 130 by varying modulation commands provided to the inverter 130. The modulation commands control the pulse width modulation provided by switching devices (e.g. IGBTs and/or reverse blocking IGBTs) to provide a desired real and/or reactive output by the inverter 130.

Control system 150 can also be used to control various other components of the power converter system 100, such as circuit breakers, disconnect switches, and other devices to control operation of the power converter system 100. The control system 150 can include any number of control device(s) such as processor(s), microcontroller(s), microcomputer(s), programmable logic controller(s), application specific integrated circuit(s) or other suitable control device(s).

Figure 2:
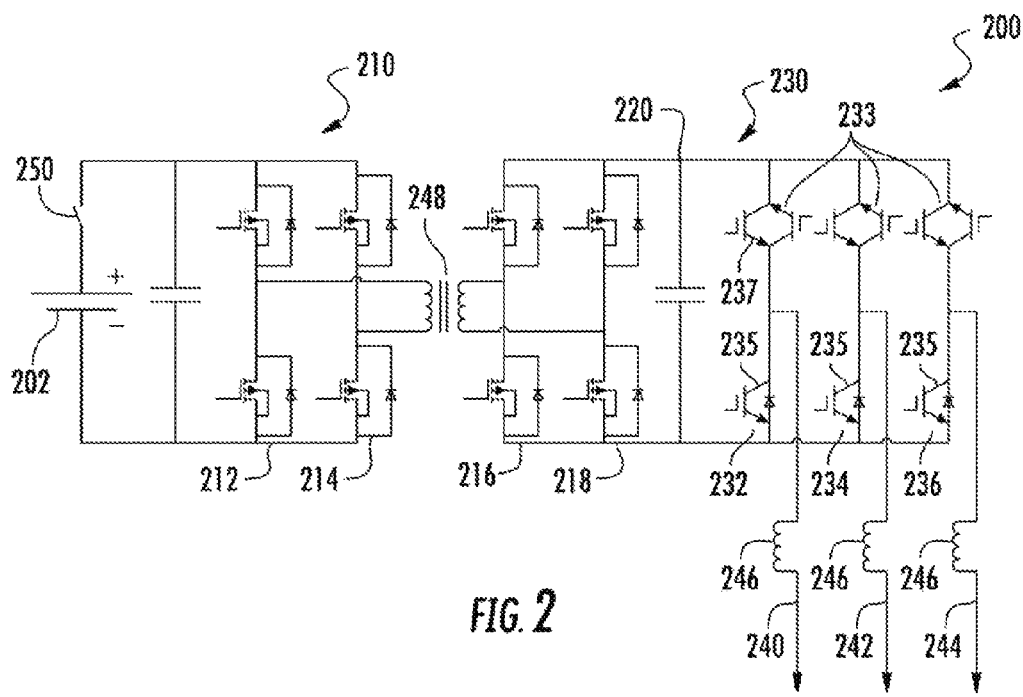
FIG. 2 depict an example power converter system according to example embodiments of the present disclosure.

FIG. 2 depicts an example power converter system 200 associated with an energy storage system according to example embodiments of the present disclosure. Power converter system 200 can correspond to power converter system 100 or other power converter system. Power converter system 200 includes a DC to DC converter 210 and an inverter 230. As shown, inverter 230 includes a plurality of inverter bridge circuits 232, 234, and 236 that include power electronic devices that are used to convert DC power from the DC link 220 to output AC power at a grid frequency for supply to the AC grid. Each inverter bridge circuit 232, 234, and 236 is associated with an output phase of the inverter 230. For instance, inverter bridge circuit 232 is associated with the output line 240 of the inverter 230. Inverter bridge circuit 234 is associated with the output line 242 of the inverter 230. Inverter bridge circuit 236 is associated with output line 244 of the inverter 230. In this manner, bridge circuits 232, 234, and 236 can provide outputs on the respective output lines to the AC grid via inductors 246.

Each inverter bridge circuit 232, 234, and 236 includes a switching module. It will be appreciated that, in some implementations, the inverter bridge circuits may include a plurality of switching modules coupled in parallel. Each switching module includes a pair of switching elements (e.g. IGBTs, or reverse blocking IGBTs) coupled in series with one another. The output of the switching module is coupled to the switching module at a location between the pair of switching elements. Inverter 230 can act as a buck inverter when exporting power from an input power source 202, and can act as a boost inverter when importing power to input power source 202.

In particular, inverter bridge circuits 232, 234, and 236 and the corresponding switching modules include upper switching elements 233 and lower switching elements 235. Upper switching elements 233 each include a pair of reverse blocking IGBTs 237 coupled in antiparallel. Lower switching elements 235 can be IGBTs. A diode is coupled in an antiparallel manner with each of the individual lower switching elements 235. It will be appreciated that, in some implementations, lower switching elements 235 can also include one or more reverse blocking IGBTs, such as, for instance, a pair of reverse blocking IGBTs coupled in antiparallel.

As indicated above, the antiparallel reverse blocking IGBTs can be configured to conduct current in a bidirectional manner. For instance, reversals of current polarity caused by resistance to an interruption in current flow to inductors 246 can be efficiently conducted by the reverse blocking IGBTs. In this manner, the antiparallel reverse blocking IGBTs can be configured to conduct at all times during operation of system 200.

As indicated above, DC to DC converter 210 is used to convert the DC power provided by the input power source 202 to a DC power provided to the DC link 220. The DC to DC converter 210 can be a buck converter, a boost converter, or a buck-boost converter. As shown, the DC to DC converter 210 includes a plurality of input bridge circuits 212, 214, 216, and 218 that include power electronic devices that are used to convert power from the input power source to a DC power provided to the DC link 220.

Each input bridge circuit 212, 214, 216, and 218 includes a switching module. Each switching module includes a pair of switching elements coupled in series with one another. In particular, each switching element can be a SiC MOSFET switching element. A diode can be coupled in parallel with each of the individual switching elements.

The power converter system 200 further includes an isolation transformer 248. Isolation transformer 248 can be a high frequency planar transformer or other suitable transformer. Isolation transformer can provide voltage isolation between input power source 202 and the AC grid. In various implementations, isolation transformer can be a step up transformer or a step down transformer. Power converter system 200 can further include a contactor 250 coupled to input power source 202. Contactor 250 can be configured to selectively couple input power source to the system 200. For instance, operation of contactor 250 can be controlled to couple or decouple input power source 202 to the system. In some implementations, contactor 250 can provide a lockout/tagout capable disconnect.

Figure 3:
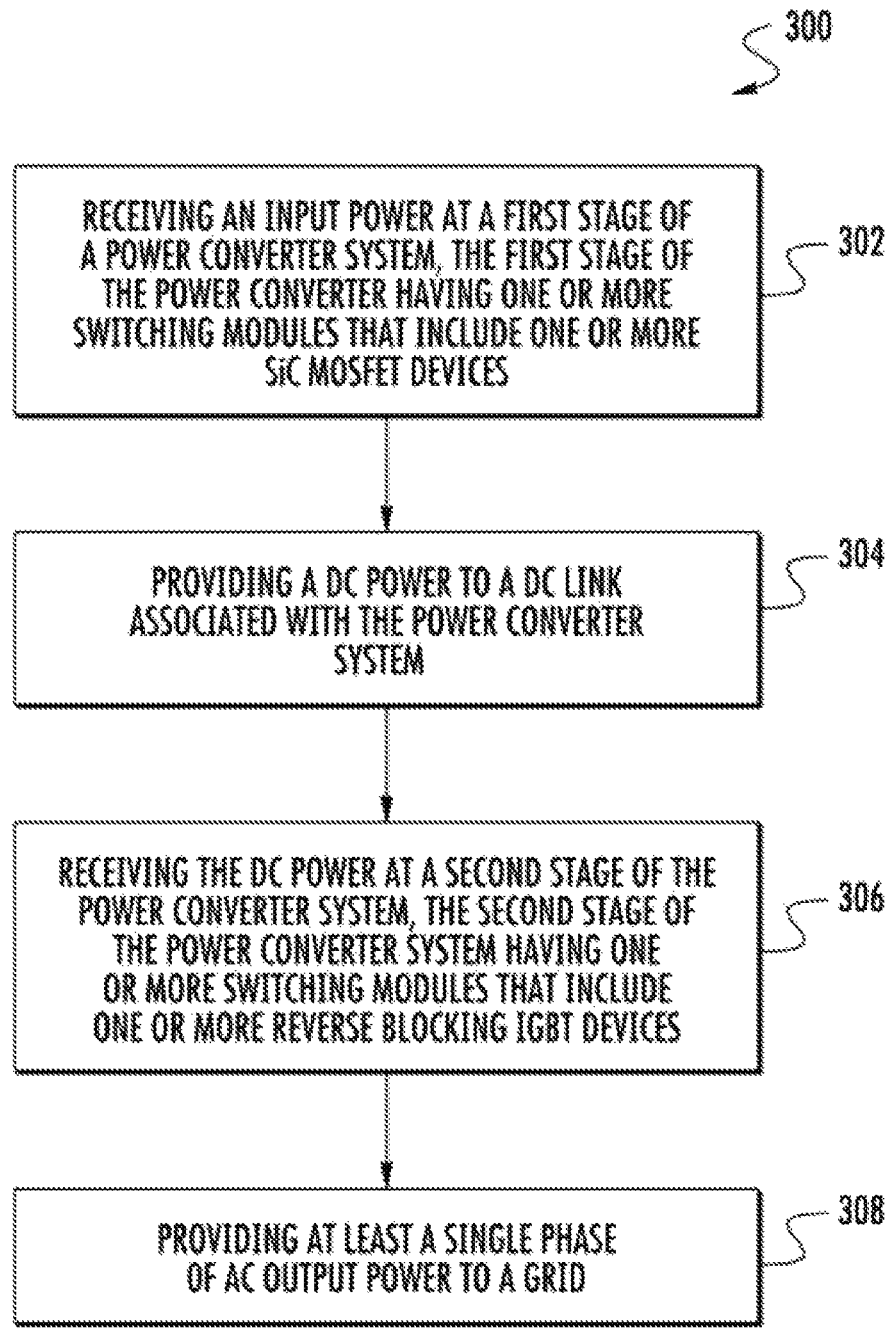
FIG. 3 depicts a flow diagram of an example method of providing at least a single phase of output power to a grid according to example embodiments of the present disclosure.

FIG. 3 depicts a flow diagram of an example method (300) of providing at least a single phase of output power to a grid using a power converter according to example embodiments of the present disclosure. FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include receiving an input power at a first stage of a power converter system. For instance, the input power can be a DC power. The first stage of the power converter system can include a DC to DC converter configured to boost the input power and to provide the boosted power to a DC link of the power converter system. The first stage of the power converter system can include a plurality of input bridge circuits coupled in parallel. Each bridge circuit can include one or more switching modules having one or more switching elements coupled in series. The switching elements can be SiC MOSFET devices.

At (304), method (300) can include providing a DC power to the DC link associated with the power converter system.

For instance, the DC power can be the boosted power associated with the first stage of the power converter system.

At (306), method (300) can include receiving the DC power at a second stage of the power converter system. The second stage of the power converter system can be a DC to AC inverter configured to provide at least a single phase of output power to a grid or other load. The second stage of the power converter system can include a plurality of inverter bridge circuits coupled in parallel. The inverter bridge circuits can include one or more switching modules having an upper switching element and a lower switching element. In some implementations, the upper switching element can include one or more reverse blocking transistors (e.g. reverse blocking IGBTs). For instance, the upper switching elements can include a pair of reverse blocking transistors coupled in antiparallel.

At (308), method (300) can include providing at least a single phase of AC output power to a grid or other load.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An energy storage system comprising:
    an input power source configured to provide DC power;
    a power converter couplable to the input power source and configured to generate AC power substantially at a grid frequency, the power converter comprising:
        a first stage configured to boost the DC power, the first stage comprising one or more input bridge circuits comprising a plurality of input switching modules coupled in parallel, each input switching module of the plurality of input switching modules comprising a pair of silicon carbide transistors; and
        a second stage configured to convert the boosted DC power to the AC power, the second stage comprising one or more inverter bridge circuits, each associated with an output phase of the power converter, each inverter bridge circuit comprising one or more inverter switching modules, each inverter switching module comprising a pair of switching elements coupled in series with one another and an output coupled between the pair of switching elements, wherein at least one switching element of each inverter switching module comprises a reverse blocking transistor.

2. The energy storage system of claim 1, wherein the reverse blocking transistor is a reverse blocking insulated-gate bipolar transistor, and wherein the silicon carbide transistors are silicon carbide metal-oxide semiconductor field-effect transistors.

3. The energy storage system of claim 1, wherein the one or more inverter switching modules comprise an upper switching element and a lower switching element.

4. The energy storage system of claim 3, wherein the upper switching element in each first switching element comprises a pair of reverse blocking insulated-gate bipolar transistors coupled in an antiparallel manner, and wherein the lower switching element in each first switching element is an insulated-gate bipolar transistor coupled to a diode in an antiparallel manner.

5. A power converter system, comprising:
    a power converter couplable to an input power source and configured to generate AC power substantially at a grid frequency, the power converter comprising:
        a first stage configured to boost DC power provided by the input power source; and
        a second stage configured to convert the boosted DC power to the AC power, the second stage comprising one or more inverter bridge circuits, each associated with an output phase of the power converter, each inverter bridge circuit comprising one or more first switching modules, each first switching module comprising a pair of switching elements coupled in series with one another and an output coupled between the pair of switching elements, wherein at least one switching element of each first switching module comprises a reverse blocking transistor.

6. The power converter system of claim 5, wherein the first stage of the power converter comprises one or more input bridge circuits, each comprising a plurality of second switching modules coupled in parallel, each second switching module comprising a pair of silicon carbide transistors.

7. The power converter system of claim 5, wherein the reverse blocking transistor is a reverse blocking insulated-gate bipolar transistor, and wherein the silicon carbide transistors are silicon carbide metal-oxide semiconductor field-effect transistors.

8. The power converter system of claim 6, wherein each input bridge circuit is couplable to the input power source and configured to generate the boosted DC power and provide the boosted DC power to a DC link, the DC link coupling the input bridge circuit to the inverter bridge circuit.

9. A power converter system of claim 5, wherein at least one switching element of each first switching module comprises a pair of reverse blocking insulated-gate bipolar transistors coupled in an antiparallel manner.

10. The power converter system of claim 5, further comprising an isolation transformer coupled between two second switching modules.

11. The power converter system of claim 10, wherein the isolation transformer is a high frequency planar transformer.

12. The power converter system of claim 5, wherein each switching element in the one or more first switching modules comprises a reverse blocking insulated-gate bipolar transistor.

13. The power converter system of claim 5, wherein each switching element in the one or more first switching modules comprises a pair of reverse blocking insulated-gate bipolar transistors coupled in an antiparallel manner.

14. The power converter system of claim 1, wherein the power converter provides a multiphase output power, the power converter comprising an inverter bridge circuit associated with each output phase of the multiphase output power.

15. The power converter system of claim 1, wherein the one or more first switching modules comprise an upper switching element and a lower switching element.

16. The power converter system of claim 15, wherein the upper switching element in each first switching element comprises a pair of reverse blocking insulated-gate bipolar transistors coupled in an antiparallel manner.

17. A power converter system of claim 16, wherein the lower switching element in each first switching element is an insulated-gate bipolar transistor, wherein a diode is coupled in an antiparallel manner to the insulated-gate bipolar transistor.

18. A method of providing at least a single phase of AC power to an electrical grid, the method comprising:
   receiving DC power at a first stage of a power converter, the first stage comprising one or more input switching modules configured to boost the DC power;
   providing the boosted DC power to a DC link of the power converter;
   receiving the boosted DC power at a second stage of the power converter, the second stage comprising one or more inverter switching modules configured to convert the boosted DC power to the AC power, the one or more inverter switching modules comprising at least one reverse blocking transistor; and
   providing at least a single phase of the AC power to the electrical grid.

19. The method of claim 18, wherein the at least one reverse blocking transistor is a reverse blocking insulated-gate bipolar transistor, and wherein the one or more input switching modules comprise one or more silicon carbide metal-oxide semiconductor field-effect transistors.

20. The method of claim 18, wherein at least one inverter switching module comprises a pair of reverse blocking insulated-gate bipolar transistors coupled in an antiparallel manner.

* * * * *